N. R. MOORE.
AUTOMOBILE CAMP TRAILER.
APPLICATION FILED SEPT. 8, 1920.

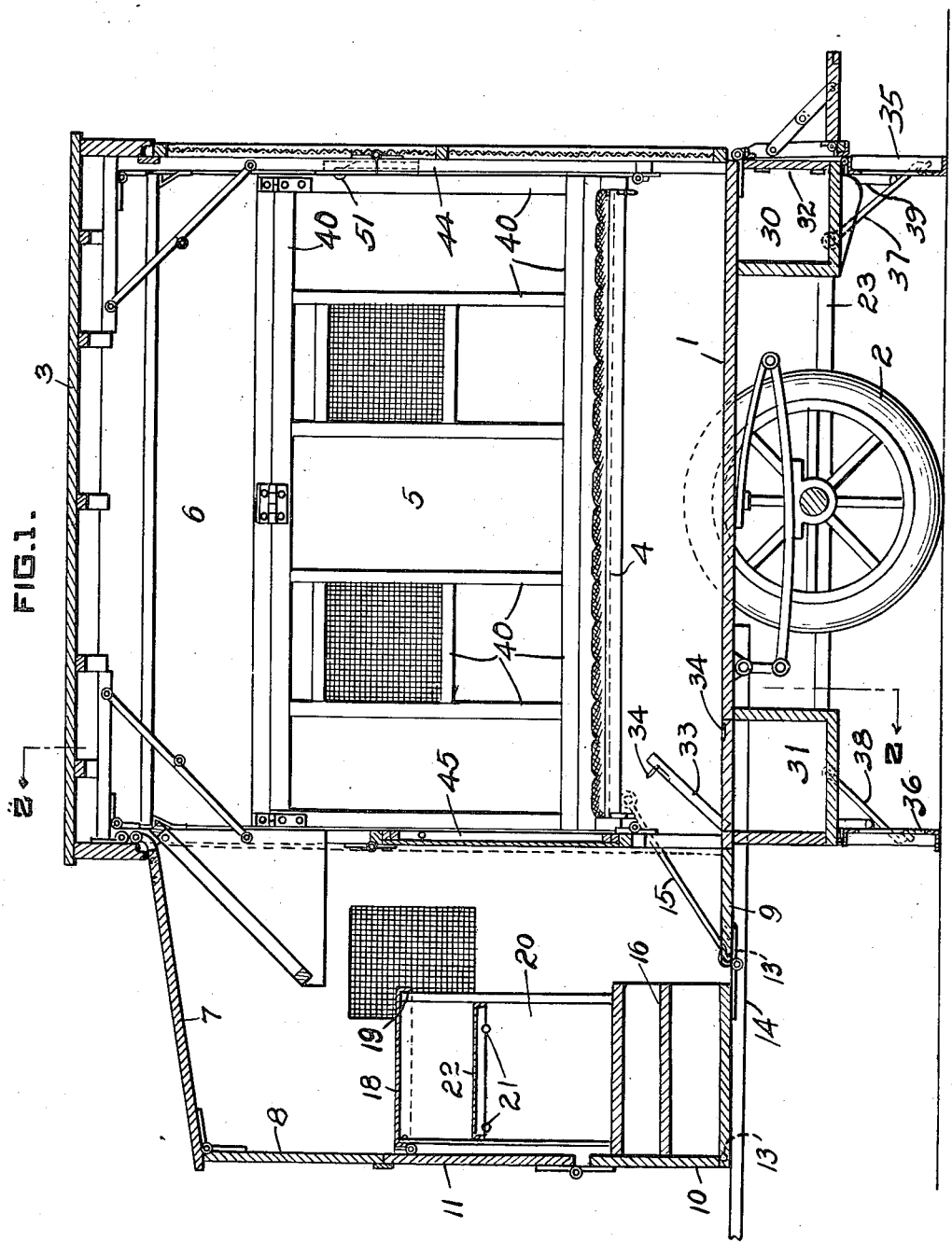

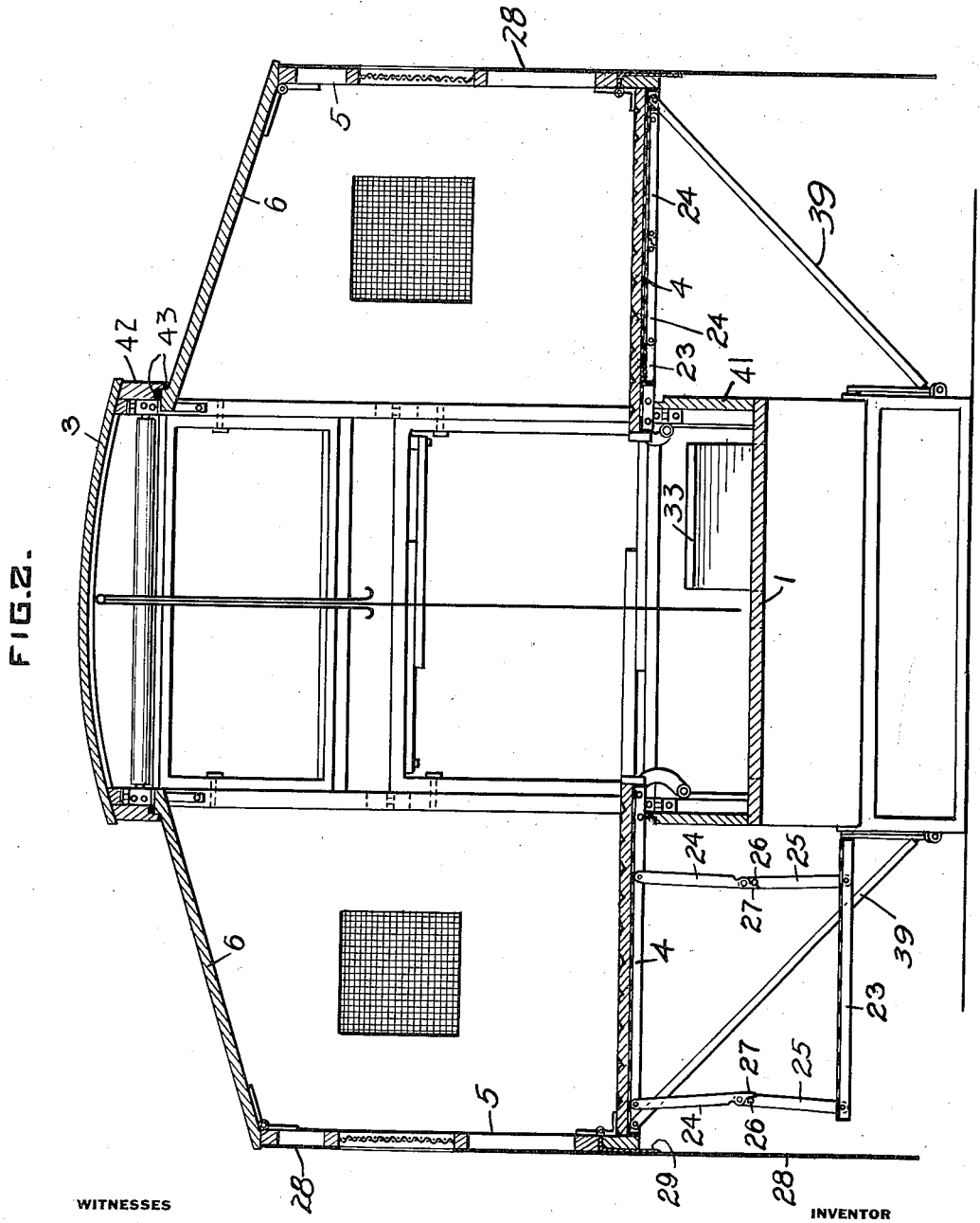

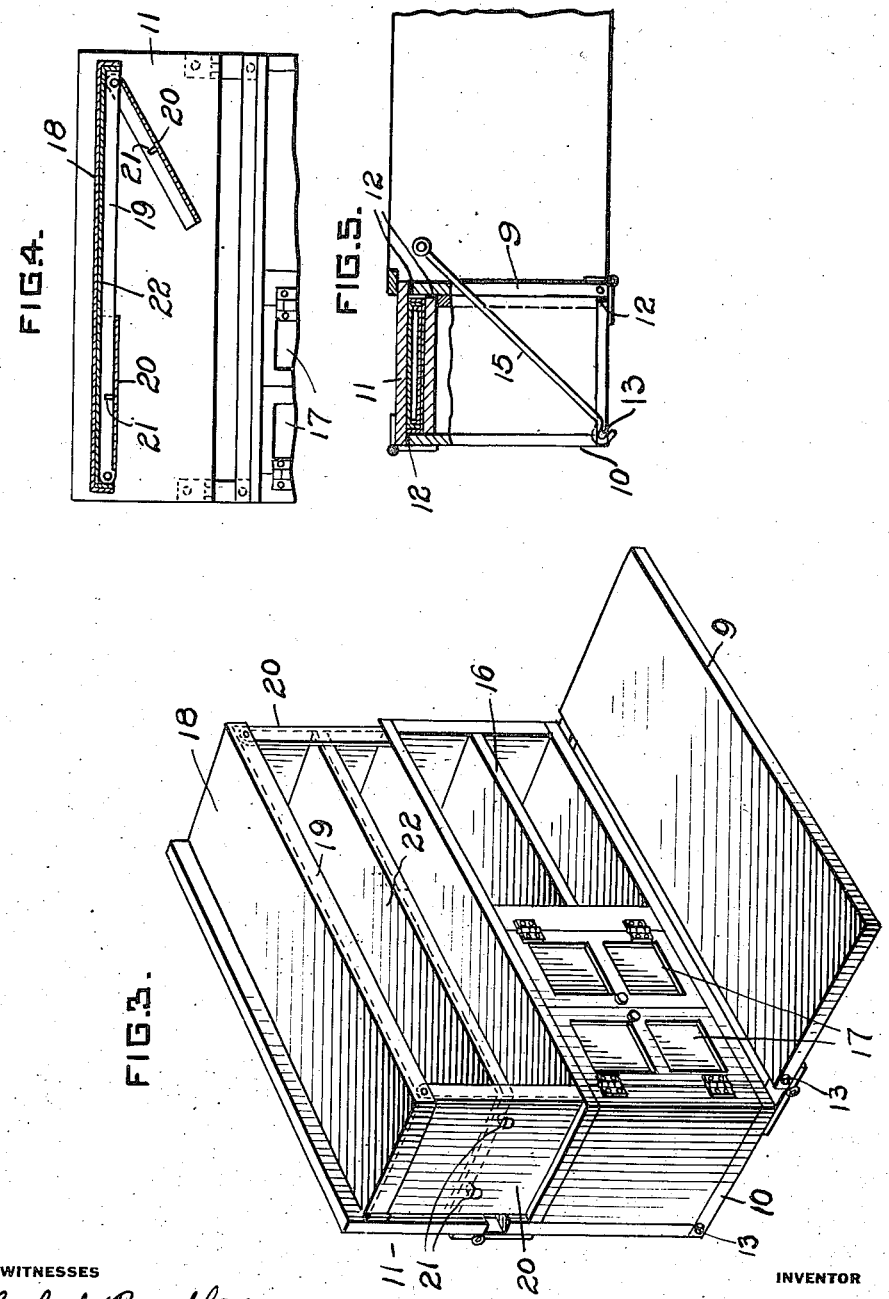

1,435,251.

Patented Nov. 14, 1922.
5 SHEETS—SHEET 4.

WITNESSES
J. Herbert Bradley.

INVENTOR
Ninian R. Moore
By Green and McCallister
His Atty's

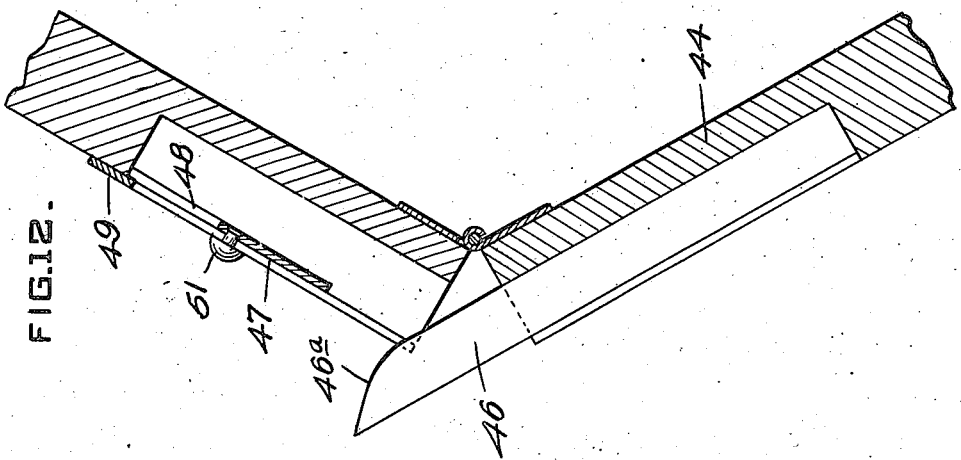
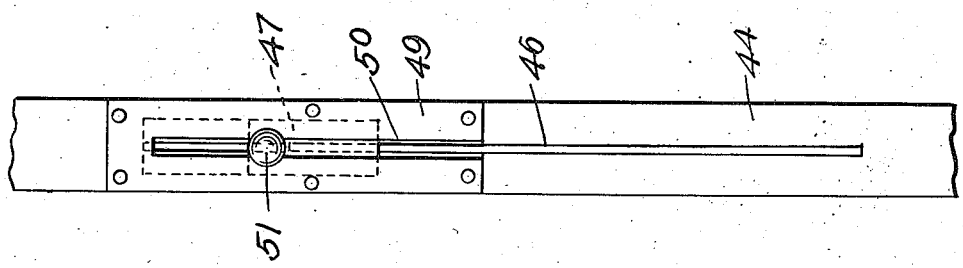
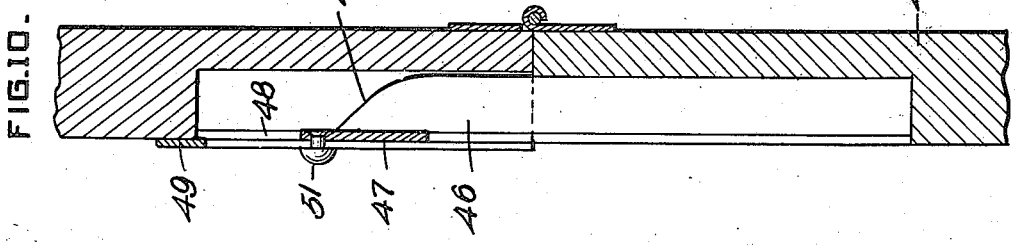

Patented Nov. 14, 1922.

1,435,251

UNITED STATES PATENT OFFICE.

NINIAN R. MOORE, OF DUBOIS, PENNSYLVANIA.

AUTOMOBILE CAMP TRAILER.

Application filed September 8, 1920. Serial No. 408,832.

*To all whom it may concern:*

Be it known that I, NINIAN R. MOORE, a citizen of the United States, and a resident of Dubois, in the county of Clearfield and State of Pennsylvania, have made a new and useful Improvement in Automobile Camp Trailers, of which the following is a specification.

My invention relates to camp trailers such as are used by automobile tourists and consists in improvements in the vehicle disclosed in my United States Patent No. 1,386,943.

A feature of the trailer described in the above mentioned patent is a collapsible kitchenette and one object of my present invention is to provide such a kitchenette with fewer hinged sections but expansible and foldable to the same extent.

Another object is to better support the kitchenette section when set up and when collapsed into a storage compartment. Another object is to provide easier access to a storage box beneath the trailer body. A further object is to increase the sleeping capacity of the trailer without increasing its travelling bulk. I also desire to make the trailer, when set up for occupancy, more rigid than in the previous construction. An additional object is to provide a yielding mounting for a flexible side wall. A still further object is to provide means for excluding dust from the interior of the trailer collapsed and in travelling assembly. Another object is to avoid damage to the storage box suspended below the rear of the trailer body.

Figure 8:
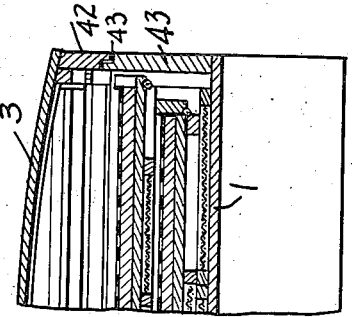
Figure 9:
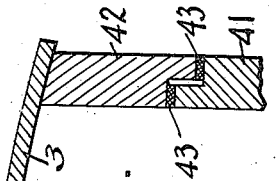
Figure 7:
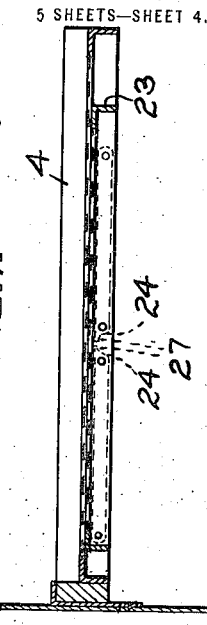
Figure 6:
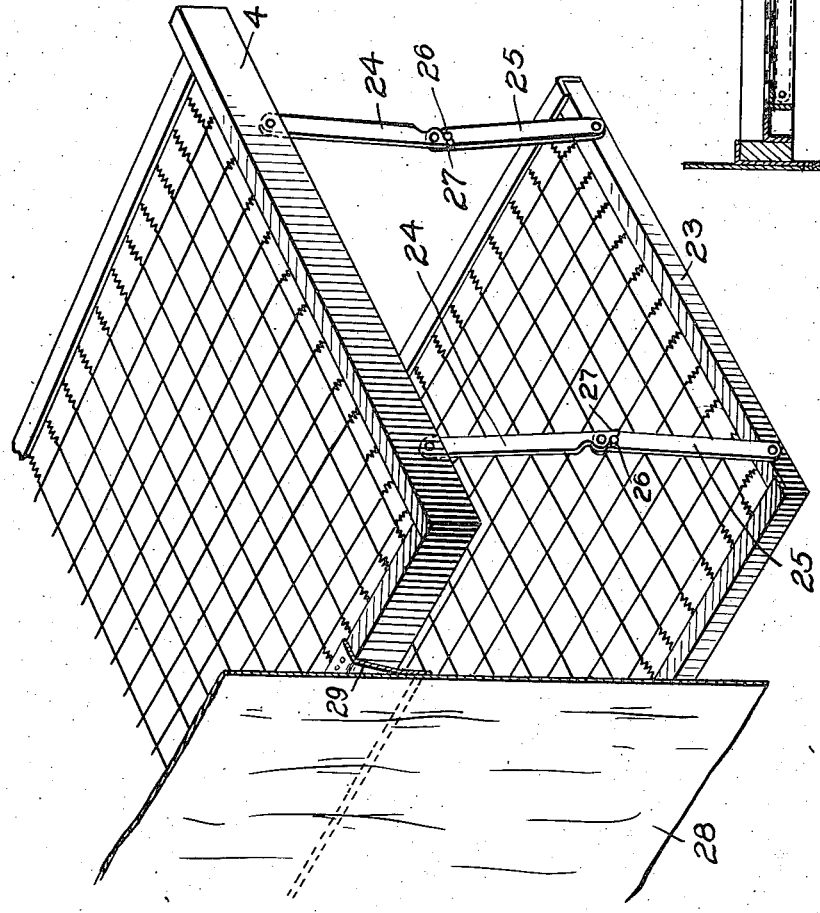

In the accompanying drawings, illustrating my invention, Figure 1 is a longitudinal, vertical section thru my trailer when set up for occupancy; Fig. 2 is a transverse, vertical section on line 2—2 of Fig. 1; Fig. 3 is a perspective of the lower part of the kitchenette section, looking at its inner side and showing this part opened up for use; Fig. 4 is a front elevation of the upper shelves seen in Fig. 3 showing how they collapse for folding; Fig. 5 is a transverse, vertical section thru the lower part of the kitchenette, when folded; Fig. 6 is a perspective of the bed arrangement on one side of the trailer; Fig. 7 is a transverse, vertical section showing the lower bed in Fig. 6 telescoped within the upper one; Fig. 8 is a partial section thru the collapsed trailer; Fig. 9 is an enlarged detail of the dust proof joint provided between the meeting edges of the trailer top and body when collapsed for travelling, and Figs. 10, 11 and 12 are sections and a view of a hinge lock used on the posts which support the top when in raised position.

As described in detail in the patent above referred to, the trailer consists of a body 1 mounted on wheels 2 and having a rigid top 3 adapted to rest upon the body to form a trailer of relatively small bulk, when travelling, or to be supported in a raised position, when the trailer is set up, to form a roof portion of a habitable compartment.

Sections 4, 5 and 6 on each side of the body 1 are hinged to each other and section 4 is hinged to the body side and all the sections are adapted to fold compactly on their hinges and into the body and to be contained therein beneath the lowered top 3.

The left hand end of Fig. 1 illustrates the kitchenette set up for use. Its upper part is formed by sections 7 and 8 which fold upon each other and against top 3. The lower portion consists of several sections which, for convenience, I term horizontal section 9, right-angular section 10 and vertical section 11. When the kitchenette is folded, these sections assume the position shown in Fig. 5 in which section 9 becomes the end of the trailer body and with sections 10 and 11 forms a closed box with section 11 as the top. Between adjacent sections, I provide compressible packing or weather-stripping 12 to keep out the dust which is present on all roads and which sifts into any available crevice when the trailer is travelling and which forms a very unpleasant feature of touring with present trailers.

A trailer draft member 14 supports the kitchenette or folded box, and hooks 15, pivoted to the body sides, engage suitable catches 13 on the sections 9 and 10 respectively to assist in supporting the sections in either position.

A shelf 16 and a cabinet with doors 17 form a rigid part of section 10 and, when the kitchenette is collapsed, sections 9 and 11 fold to enclose this shelf and cabinet and combine with same and section 10 to complete the travelling storage box shown in Fig. 5. Section 11 is provided with a main shelf 18 formed of sheet metal and reinforced by downturned flanges 19 around its edge.

Sheet metal supports 20 are pivoted to shelf 18 and have integral lugs 21 struck up which support a secondary shelf 22. Shelf 22 and supports 20 are adapted to be nested within shelf 18 and the latter is hinged to section 11 so that it may be folded parallel therewith so as to occupy a minimum amount of space on top of section 10. When shelf 18 is swung to the position shown in Fig. 3, supports 20 and shelf 22 drop into their respective positions without manual adjustment.

Beneath the ends of the trailer body are storage boxes 30 and 31. Box 30 has doors 32 hinged at their sides and opening to the rear of the vehicle. The similar arrangement of doors for box 31, as shown in my patent previously mentioned, would make the box interior so inconveniently accessible when the kitchenette is set up, that I avoid such construction by providing box 31 with doors 33 which normally form a part of the body floor and resemble trap doors hinged at one edge to the body floor and adapted to be lifted at an opposite edge by handles 34. A container may be kept in box 31 and, when the kitchenette is opened, may be removed bodily and set on shelf 18 and doors 33 closed. This arrangement avoids the necessity of carrying the material stored in box 31 around the trailer and back when the box is unpacked and packed besides making the contents more accessible.

Boxes 30 and 31 are provided with angle frames 35 and 36, each hinged to its respective box and adapted to fit around the box front or to swing to the position shown in Fig. 1 to steady and partially support the trailer in its set up position. Frames 35 and 36 are secured in either position by their respective hooks 37 and 38. The bottom of box 30 is inclined upwardly from the door to the inner wall. This construction is advantageous as, when the trailer passes over a ridge or other unusual obstruction, and the front of the trailer is simultaneously tilted upwardly by the towing automobile, the sloping bottom of the box will slide over an obstruction which would catch a square box and tear it from the trailer body. The forward box does not need such a modification as it is in front of the axle and is raised instead of being lowered when the draft arm 14 is raised by the towing machine. The advantages of the sloping bottom of the box and the obtuse angle formed with its back are obtained without seriously reducing its capacity.

Pivotally mounted on section 4 are struts 39 which fold to a storage position parallel to their respective sections when the trailer is collapsed but are positioned as shown in Fig. 2 when the trailer is set up. The lower end of each strut is shouldered and is adapted to engage the angle frame and adjacent hook of the storage boxes 30 and 31 respectively. This offers a better diagonal support for the outer edge of frame 4 than secured by a brace to the boxes only. It also adds rigidity to the supporting angle frames 35 and 36 in their trailer supporting positions.

To provide additional sleeping accommodations, I suspend from the frame of section 4, a frame 23 fitted with a flat bed spring and adapted to nest within frame 4. Frame 23 is suspended beneath frame 4 far enough to provide plenty of room for a person to recline thereon and still be far enough removed from the ground to avoid crawling insects and dampness. The suspension means for frame 23 comprises jointed links 24 and 25, one adapted to fold within the other when the bed sections are telescoped as shown in Fig. 7. By means of a pin 26 and cooperating hook 27, I maintain the links 24 and 25 at a slight angle which facilitates their buckling towards each other when frame 23 is lifted towards frame 4.

When the trailer is being opened up for occupancy, the telescoped section 23 may be lifted by its side farthest removed from the hinged side of section 4 and (with links 24 and 25 next the hinged side of section 4 collapsed and the opposite links extended) this raised side of frame 23 forms a convenient handle for lifting and turning the heavier section 4 and the other sections hinged to and folded with section 4.

Fig. 6 illustrates an advantageous manner of securing a side curtain to frame 4 when a flexible wall is used rather than a rigid panel. The side curtain 28 is suspended from a horizontal member of frame 5, preferably the top thereof, reaches a substantial distance below frame 23, when the latter is in its lowermost position and may be of canvas or similar material. A strip 29 is secured to the outside member of frame 4 and hangs a short distance therefrom and has its lower end stitched to curtain 28. This prevents flapping of curtain 28 against the side of frame 4, supports its weight at different points and prevents the contact of curtain 28 and the adjacent portion of frame 4 which would permit rain, running down the side of a canvas curtain, to penetrate thru the curtain to the discomfort of the occupants.

If curtain 28 is of canvas, it will shrink when wet by rain. Connecting strip 29 will permit this shrinking to take place without strain such as would be produced by tacking or clamping of the curtain on frame 4. This flexible connection is also desirable when the side frame 5 is folded upon frame 4, producing a gap between the adjacent hinged members of the frames. But for strip 29 this gap would have to be accommodated by the stretching of the canvas curtain or by providing the curtain with an unsightly fullness when the sections are erected.

The dust proof joint shown in Fig. 8 and 9 is provided by rabbeting the meeting edges of the body and top. These edges, 41 and 42 for example, are provided with strips 43 of rubber or other compressible packing material and at least one, if not both, of these strips will be compressed when the top is lowered and secured in contact with the body. This joint is preferably carried all around the trailer and when the trailer is collapsed for travelling, the enclosed bedding, clothing and other articles are protected from the fine sifting road dust by the sealed joint.

It will be noted that each side section 5 of the sleeping compartment includes frame members 40 upon which the side curtain or panel is mounted. Members 40 are of substantial thickness and, as best shown in Fig. 1 they are so spaced from each other that recesses are formed between them which afford excellent spaces for placing clothes, linen or other goods which it is desired to keep unmussed. When the trailer is collapsed, these articles will be held smoothly and flatly between the folded sections 5 and 6.

When the trailer is set up and the rear, jointed, top supporting posts 44 are erected to the vertical position shown in Fig. 1, I provide means for holding them rigid until the front posts 45 may be raised and the sides opened out. This is especially desirable when one man is setting up the trailer, which is quite feasible with my device.

These means consists of the blade 46 and latch 47 shown in Figs. 10, 11 and 12. Blade 46 is flat and fixedly secured in the upper end of the lower portion of post 44, extending beyond the end of the latter and having its outer end tapered to form a cam 46ª. Latch 47 is vertically slidably mounted on the lower end of the upper portion of post 44 and preferably slides in a recess 48 in the post behind a cover plate 49 which is slotted at 50 to provide for the insertion of blade 46 and for the passage of a shank for an operating button 51.

When the post section moves from the position shown in Fig. 10, catch 47 rides up the cam 48 on blade 46 and drops over the back of same, preventing hinging of the two post sections until it is raised manually by means of button 51.

I claim:—

1. A camp trailer comprising a body portion, a collapsible cabinet mounted thereon and adapted to form one of the walls of said body portion.

2. A camp trailer comprising a body portion, a collapsible cabinet mounted thereon and adapted to form one of the walls of said body when in collapsed position.

3. A camp trailer comprising a body portion, a collapsible cabinet mounted thereon for movement toward and away from said body portion, said cabinet having a side adapted to form a continuation of the floor of said body portion when said cabinet is moved away from said body portion and to form a side wall of said body portion when moved toward the same.

4. A camp trailer comprising a body portion, a collapsible cabinet mounted thereon and adapted to be moved into positions adjacent thereto and remote therefrom, said cabinet having a member adapted to bridge the space between said cabinet and said body portion when occupying a remote position and to provide one of the walls of said body portion when adjacent thereto.

5. A camp trailer comprising a main body portion and a collapsible cabinet portion, said cabinet adapted to form the rear wall of said body when in collapsed position and to be moved to a position spaced therefrom when in extended position, and having a hinged portion adapted to bridge the space therebetween.

6. A camp trailer comprising a main body portion and a supplementary cabinet portion spaced therefrom, one of the side walls of said cabinet portion adapted to be moved to a substantially horizontal position to bridge the space between said cabinet and said main body portion, a main cover for said cabinet adapted to be moved to a substantially vertical position to form a continuation of one of the other walls thereof, an auxiliary cover mounted on said main cover and adapted to be moved to a substantially horizontal position when said main cover occupies a vertical position, and auxiliary walls carried by said auxiliary cover and adapted to be moved to substantially vertical positions to form continuations of the end walls of said cabinet when said auxiliary cover is moved to a horizontal position.

7. A camp trailer comprising a main body portion and a supplementary cabinet portion spaced therefrom, one of the side walls of said cabinet portion adapted to be moved to substantially horizontal position to bridge the space between said cabinet and said main body portion, a main cover for said cabinet adapted to be moved to a substantially vertical position to form a continuation of one of the other walls thereof, an auxiliary cover mounted on said main cover and adapted to be moved to a substantially horizontal position when said main cover occupies a vertical position, auxiliary walls carried by said auxiliary cover and adapted to be moved to substantially vertical positions to form continuations of the end walls of said cabinet when said auxiliary cover is moved to a horizontal position, and a shelf movably supported on said auxiliary side walls.

8. A camp trailer comprising a main body portion and a supplementary cabinet portion spaced therefrom, one of the side walls of said cabinet portion adapted to be moved to substantially horizontal position to bridge the space between said cabinet and said main body portion, a main cover for said cabinet adapted to be moved to a substantially vertical position to form a continuation of one of the other walls thereof, an auxiliary cover mounted on said main cover and adapted to be moved to a substantially horizontal position when said main cover occupies a vertical position, auxiliary walls carried by said auxiliary cover and adapted to be moved to substantially vertical positions to form continuations of the end walls of said cabinet when said auxiliary cover is moved to a horizontal position, and a shelf movably supported on said auxiliary side walls, and adapted to nest within said auxiliary cover when in collapsed position.

9. A camp trailer comprising a body portion having a plurality of side walls, sleeping beds extending outwardly therefrom and adapted to be collapsed into said body portion, and a collapsible cabinet carried by said body portion and adapted to form one of the walls thereof when in collapsed position.

10. A camp trailer comprising a body portion, a main sleeping bed extending outwardly therefrom and adapted to be packed in said body portion when not in use, and a supplementary bed mounted on said main bed and adapted to be moved to a position thereagainst when said main bed is packed in said body portion.

11. A camp trailer comprising a body portion, a sleeping bed hinged to the side thereof and extending outwardly therefrom and adapted to be folded thereinto when not in use, and a supplementary bed suspended from said main bed and adapted to nest within said main bed when folded into said body portion.

12. A camp trailer comprising a body portion, a plurality of main sleeping beds extending outwardly therefrom and adapted to be folded into said body portion, a plurality of supplementary sleeping beds suspended from said main beds and adapted to be moved to positions parallel thereto and contiguous therewith when said main beds are folded into said body portion.

13. A camp trailer comprising a body portion, a main sleeping bed extending outwardly therefrom, a supplementary sleeping bed disposed beneath said main bed, and a plurality of jointed struts connecting said supplementary bed to said main bed, said beds being adapted to be moved relative to each other and together be folded into nested positions within said body portion.

14. A camp trailer comprising a body portion, a main sleeping bed extending outwardly therefrom and foldable thereinto when not in use, a supplementary bed, jointed linkage mechanism for suspending said supplementary bed from said main bed, said beds being adapted to be moved relatively to each other and packed within said body portion in superposed relation, with respect to each other, and means for preventing the respective links of said mechanism from becoming alined with each other.

In testimony whereof, I have hereunto subscribed my hand this 14th day of August, 1920.

NINIAN R. MOORE.